United States Patent [19]

Carson et al.

[11] 4,309,328

[45] Jan. 5, 1982

[54] STABLE AQUEOUS DISPERSIONS OF PARTICLES OF VINYLIDENE FLUORIDE POLYMER

[75] Inventors: Dennis W. Carson, Lower Burrell; Ralph C. Gray, Allison Park; Glenn W. Luckock, Natrona Heights, all of Pa.

[73] Assignee: PPG Industries, Inc., Pittsburgh, Pa.

[21] Appl. No.: 98,158

[22] Filed: Nov. 28, 1979

[51] Int. Cl.$^3$ .............................................. C08L 27/16
[52] U.S. Cl. ................. 260/29.6 F; 428/522; 525/199
[58] Field of Search ................. 260/29.6 F, 29.6 NR, 260/29.6 RW, 29.6 CM

[56] References Cited

U.S. PATENT DOCUMENTS

| | | | |
|---|---|---|---|
| 3,169,120 | 2/1965 | Capron et al. | 260/29.6 F |
| 3,324,069 | 6/1967 | Koblitz et al. | 260/31.4 R |
| 3,886,103 | 5/1975 | Koizumi et al. | 260/29.6 F |
| 3,896,071 | 7/1975 | Poirier | 260/29.6 F |
| 4,022,737 | 5/1977 | Sekmakas et al. | 260/29.6 F |
| 4,031,286 | 6/1977 | Seymus | 428/324 |
| 4,128,519 | 12/1978 | Bartoszek et al. | 260/29.6 F |
| 4,141,873 | 2/1979 | Dohany | 260/29.6 F |

FOREIGN PATENT DOCUMENTS

| | | |
|---|---|---|
| 1323527 | 7/1973 | United Kingdom . |
| 1330454 | 9/1973 | United Kingdom . |
| 1382512 | 2/1975 | United Kingdom . |
| 1418954 | 12/1975 | United Kingdom . |

OTHER PUBLICATIONS

Chemical Abstracts, vol. 87 (1977), 87:203156z, p. 70.
Physical Chemistry of High Polymeric Systems-Mark et al., Second Edition, 1950, pp. 274–275.
Textbook of Polymer Science-Billmeyer, Second Edition, 1971, p. 65.

*Primary Examiner*—Harold D. Anderson
*Attorney, Agent, or Firm*—George D. Morris; Charles R. Wilson

[57] ABSTRACT

Coating compositions based on stable aqueous dispersions of particles of vinylidene fluoride polymer are prepared by bringing into admixture unstabilized particles of vinylidene fluoride polymer, liquid organic active solvent for the vinylidene fluoride polymer, liquid nonsolvent, which may be liquid organic nonsolvent, water or a combination of liquid organic nonsolvent and water, and, if not present in the liquid nonsolvent, water. The mixing is conducted such that the particles of vinylidene fluoride polymer are wetted by the dispersion vehicle, yet the particles are not substantially solubilized by the active solvent.

28 Claims, No Drawings

STABLE AQUEOUS DISPERSIONS OF PARTICLES OF VINYLIDENE FLUORIDE POLYMER

Coating compositions containing particles of vinylidene fluoride particles have been found useful especially where flexibility and durability are desired in the resulting films. Such coating compositions have been made in the past using aqueous emulsions or latices of particles of vinylidene fluoride polymer. These emulsions or latices usually contain a conventional surfactant such as, for example, alkyl aryl polyether alcohols having polyoxyethylene units on the sidechain, block polymers of ethylene oxide and propylene oxide and polyoxyethylene fatty acid esters.

It is desirable to use unstabilized particles of vinylidene fluoride polymer in formulating coating compositions. Unfortunately, however, once the particles of vinylidene fluoride polymer are in the unstabilized state, as for example by drying to form a powder, it is quite difficult to use them to form a stabilized dispersion. The problem is particularly acute in formulating aqueous coating compositions because of the high degree of hydrophobicity of the vinylidene fluoride polymer particles.

It is nevertheless desirable in many instances to use unstabilized particles of vinylidene fluoride polymer, particularly the substantially dry powder, in formulating coating compositions. Such unstabilized particles are often easier to store, ship and handle than emulsions or latices.

The present invention provides methods for producing stable aqueous dispersions of particles of vinylidene fluoride polymer.

A common characteristic of all of the embodiments of the invention is that the particles of vinylidene fluoride polymer are wetted by a dispersion vehicle using liquid organic active solvent for the vinylidene fluoride polymer and liquid nonsolvent which may be liquid organic nonsolvent, water or a combination of liquid organic nonsolvent and water such that the particles are not substantially solubilized by the active solvent. In order that the mixture will be compatible with water, the active solvent is miscible with water and, when used, the liquid organic nonsolvent is miscible with water and with the active solvent.

A second common characteristic of all of the embodiments of the invention is that the dispersion vehicle is at least partially neutralized before the dispersion vehicle is brought into contact with significant amounts of water.

As used throughout the specification and claims "stabilized" is a characteristic of particles which are not able to significantly agglomerate or flocculate. Even if stabilized particles do eventually settle, they may be easily redispersed by mild agitation such as stirring or shaking. "Unstabilized", on the other hand, is a characteristic of particles which significantly agglomerate of flocculate. Usually stabilized particles settle more slowly than unstabilized particles and in some cases where stabilization is especially effective do not settle to any significant extent over long periods of time.

The unstabilized particles of vinylidene fluoride polymer are usually used in the form of a substantially dry powder in preparing the stabilized dispersions of the invention. However, dampened unstabilized particles or unstabilized dispersions of particles may be employed.

While the vinylidene fluoride polymer of the particles used in preparing the stabilized dispersions of the invention is usually vinylidene fluoride homopolymer, such polymer may also be vinylidene fluoride interpolymer wherein at least about 95 mole percent of the monomers used in forming the polymer is vinylidene fluoride. Examples of suitable monomers which may be interpolymerized with vinylidene fluoride include symmetrical dichlorodifluoroethylene, 1,1,1-trifluoro-2-chloroethylene, tetrafluoroethylene, hexafluoropropylene, vinyl fluoride and vinyl chloride.

The number average molecular weight of the vinylidene fluoride polymer constituting the particles is subject to wide variation but is at least about 5000. Typically the number average molecular weight is in the range of from about 10,000 to about 30,000. A number average molecular weight in the range of from about 12,000 to about 20,000 is preferred.

The size of vinylidene fluoride polymer particles is also subject to wide variation. Usually the particles have sizes in the range of from about 0.1 micrometers to about 35 micrometers. Often they have diameters in the range of from about 0.3 micrometers to about 25 micrometers.

The liquid organic active solvent is an organic compound or a system of organic compounds which will dissolve the vinylidene fluoride polymer particles at some temperature below about 40° C. Examples of active solvents miscible with water include dimethylformamide, trimethylphosphate, triethylphospate, N,N-dimethylacetamide and tetramethylurea. A preferred such active solvent is N-methylpyrrolidone. Mixtures may be used where desired.

The liquid organic nonsolvent is an organic compound or a system of organic compounds which itself does not significantly dissolve the vinylidene fluoride polymer particles, but is miscible with water and with the active solvent. Examples of suitable liquid nonsolvents include ethylene glycol, propylene glycol, diethylene glycol, 2-methoxyethanol, 2-ethoxyethanol, 2-butoxyethanol, 2-hexoxyethanol, 2-methoxyethyl acetate, 2-ethoxyethyl acetate, 2-butoxyethyl acetate, 2-(2-methoxyethoxy)ethanol, 2-(2-ethoxyethoxy)ethanol and 2-(2-butoxyethoxy)ethanol. Mixtures may be used where desired.

The dispersion vehicle is a thermoplastic interpolymer which may be either thermosettable when used in conjunction with crosslinking agents or non-thermosettable. The monoethylenically unsaturated monomers used to form the dispersion vehicle comprise some acrylic ester monomer and usually they comprise acrylic ester monomer in major proportion. The monomers also comprise monoethylenically unsaturated acid. The term "acryclic" as used throughout the specification and claims, unless otherwise qualified either expressly or contextually, refers to ethylenic unsaturation provided by α-unsubstituted acrylyl or α-substituted acrylyl groups. Examples of α-substituted groups are methacrylyl, ethacrylyl and α-chloroacrylyl.

Examples of acrylic esters which may be used include methyl acrylate, ethyl acrylate, propyl acrylate, isopropyl acrylate, butyl acrylate, amyl acrylate, hexylacrylate, octyl acrylate, 2-ethylhexyl acrylate, methyl methacrylate, ethyl methacrylate, propyl methacrylate, isopropyl methacrylate, butyl methacrylate, amyl methacrylate, hexyl methacrylate and 2-ethylhexyl methacrylate. Because methyl methacrylate is especially compatible with vinylidene fluoride polymer, it is a preferred monomer. It is particularly preferred that methyl methacrylate constitute at least about 50 percent by weight of the monoethylenically unsaturated monomers interpolymerized to form the dispersion vehicle. Mixtures of acrylic esters may be used where desired.

The monoethylenically unsaturated monomers also comprise monoethylenically unsaturated acid. The term "acid" includes anhydrides of such acids where anhydrides exist. Examples of monoethylenically unsaturated acids include acrylic acid, methacrylic acid, ethacrylic acid, crotonic acid, isocrotonic acid, tiglic acid, angelic acid, cinnamic acid, vinylacetic acid, maleic acid, fumaric acid, itaconic acid, citraconic acid, mesaconic acid and glutaconic acid. Mixtures of acids may be used when desired. The preferred acids are acrylic acid, methacrylic acid and mixtures thereof.

The monoethylenically unsaturated monomers may also include hydroxy functional monoethylenically unsaturated monomer. Examples of such monomers include allyl alcohol, allyl carbinol crotonyl alcohol and methyl vinyl carbinol, but the hydroxy functional acrylic esters are preferred. Examples of these monomers include 2-hydroxyethyl acrylate, 2-hydroxypropyl acrylate, 3-hydroxypropyl acrylate, 2-hydroxyethyl methacrylate, 2-hydroxypropyl methacrylate and 3-hydroxypropyl methacrylate. Mixtures may be used when desired.

Some examples of additional monoethylenically unsaturated monomers that may be employed include styrene, α-methylstyrene, vinyltoluene, vinyl acetate, vinyl propionate, isopropenyl acetate, vinyl chloride, allyl chloride, dimethyl maleate and the like. Mixtures may be used where desired.

Since the stable aqueous dispersion of particles of vinylidene fluoride polymer are to be used in formulating aqueous based coating compositions, the dispersion vehicle should be at least partially neutralized. The neutralization or partial neutralization is ordinarily accomplished using ammonia or amine. The amount of acid in the interpolymer and the degree of neutralization should be such that the stabilized particles of vinylidene fluoride polymer are water-dispersible, and when dispersed in aqueous liquid diluent, form a stable aqueous dispersion of the particles. The amine may be primary, secondary or tertiary amine; however, the tertiary amines are preferred. Examples of amines which may be employed include alkyl amines such as methylamine, ethylamine, propylamine, butylamine, amylamine, dimethylamine, diethylamine, dipropylamine, dibutylamine, methylbutylamine, trimethylamine, triethylamine and tripropylamine; cycloalkyl amines such as cyclohexylamine; ethylenically unsaturated amine such as allylamine, 1,2-dimethylpentenylamine and pyrrole; arylamine such as aniline, N-methylaniline and N,N-dimethylaniline; aralkyl amines such as benzylamine and phenethylamine; alkaryl amines such as m-toluidene; cyclic amines such as morpholine, pyrrolidene and piperidine; diamines such as hydrazine, methylhydrazine, 2,3-toluenediamine, ethylenediamine, 1,2-naphthalenediamine and piperazine; and substituted amines such as histamine, hydroxylamine, ethanolamine, diethanolamine, and dimethylethanolamine. Tertiary alkanolamines and/or tertiary alkyl amines are especially preferred.

When the liquid nonsolvent is organic and when the stable dispersion is to be used in formulating aqueous based coating compositions, neutralization or partial neutralization may be accomplished at substantially any stage of the process before formulation with water. Neutralization or partial neutralization of the dispersion vehicle may, for example, be achieved prior to formation of a solution of the dispersion vehicle, during formation of the dispersion vehicle solution, after formation of the dispersion vehicle solution, during mixing of the dispersion vehicle solution and the vinylidene fluoride polymer particles, after admixing the dispersion vehicle solution and the vinylidene fluoride polymer particles or any combination of these.

When the liquid nonsolvent is water or a solution of water and one or more water miscible organic compounds, neutralization or partial neutralization should be accomplished before formulation with water. Neutralization or partial neutralization of the dispersion vehicle may be achieved prior to, during, or after dissolving the dispersion vehicle in the active solvent, the organic portion of the nonsolvent or a combination of the active solvent and the organic portion of the nonsolvent.

The stable dispersion of vinylidene fluoride polymer particles may be produced as a raw material that is later used in the formulation of other compositions such as coating compositions, or the stable dispersion may be produced during the formation of the other compositions.

The amounts of dispersion vehicle, active solvent and liquid nonsolvent in relation to the vinylidene fluoride polymer particles is subject to wide variation and is dependent, among other things, upon the identities of these materials. In general, the amounts of active solvent and liquid nonsolvent are such that surfaces of the vinylidene fluoride polymer particles are wetted by the dispersion vehicle, but the particles are not substantially solubilized by the active solvent. The amount of dispersion vehicle should be sufficient to stabilize the particles. Once the particles are stabilized, the amount of liquid nonsolvent may be increased as much as is desired.

In one embodiment of the invention, a stable aqueous dispersion of particles of vinylidene fluoride polymer is produced by bringing into admixture: (a) unstabilized particles of vinylidene fluoride polymer having a number average molecular weight of at least about 5000, (b) dispersion vehicle which is an interpolymer of monoethylenically unsaturated monomer wherein the monomers comprise acrylic ester monomer and monoethylenically unsaturated acid and which is at least partially neutralized, (c) liquid organic active solvent for the vinylidene fluoride polymer wherein the active solvent is miscible with water, (d) liquid organic nonsolvent for the vinylidene fluoride polymer wherein the organic nonsolvent is miscible with water and with the active solvent, and (e) water; wherein: (f) the active solvent is brought into contact with the particles in the presence of the liquid organic nonsolvent, (g) the dispersion vehicle is at least partially neutralized before the dispersion vehicle is brought into contact with the water, and (h) the amounts of the active solvent and the organic nonsolvent are such that the particles are wetted by the dispersion vehicle but the particles are not substantially solubilized by the active solvent.

One way to accomplish this is by admixing the unstabilized vinylidene fluoride polymer particles with a solution comprising unneutralized dispersion vehicle, the active solvent and the liquid organic nonsolvent to form a first intermediate composition, at least partially neutralizing the unneutralized dispersion vehicle in the first intermediate composition to form a second intermediate composition, and admixing the second intermediate composition and the water.

Another way is by admixing the unstabilized vinylidene fluoride polymer particles with a solution comprising the active solvent and the liquid organic nonsolvent to form a first intermediate composition, admixing the first intermediate composition with unneutralized dispersion vehicle to form a second intermediate composition, at least partially neutralizing the unneutralized dispersion vehicle in the second intermediate composition to form a third intermediate composition, and admixing the third intermediate composition with the water.

Still another way is to at least partially neutralize the unneutralized dispersion vehicle in a solution comprising the unneutralized dispersion vehicle and the liquid organic nonsolvent to form a first intermediate composition, admixing the first intermediate composition and the active solvent to form a second intermediate composition, admixing the second intermediate composition with the unstabilized vinylidene fluoride polymer particles to form a third intermediate composition, and admixing the third intermediate composition with the water.

In another embodiment of the invention a stable aqueous dispersion of particles of vinylidene fluoride polymer is produced by bringing into admixture: (a) unstabilized particles of vinylidene fluoride polymer having a number average molecular weight of at least about 5000, (b) dispersion vehicle which is an interpolymer of monoethylenically unsaturated monomers wherein said monomers comprise acrylic ester monomer and monoethylenically unsaturated acid and which is at least partially neutralized, (c) liquid organic active solvent for the vinylidene fluoride polymer wherein the active solvent is miscible with water, and (d) water; wherein: (e) the active solvent is brought into contact with the particles in the presence of the water, (f) the dispersion vehicle is at least partially neutralized before the dispersion vehicle is brought into contact with the water, and (g) the amounts of the active solvent and the water are such that the particles are wetted by the dispersion vehicle but the particles are not substantially solubilized by the active solvent.

In still another embodiment of the invention, a stable aqueous dispersion of particles of vinylidene fluoride polymer is produced by bringing into admixture: (a) unstabilized particles of vinylidene fluoride polymer having a number average molecular weight of at least about 5000, (b) dispersion vehicle which is an interpolymer of monoethylenically unsaturated monomers wherein the monomers comprise acrylic ester monomer and monoethylenically unsaturated acid and which is at least partially neutralized, (c) liquid organic active solvent for the vinylidene fluoride polymer wherein the active solvent is miscible with water, (d) liquid organic nonsolvent for the vinylidene fluoride polymer wherein the nonsolvent is miscible with water and with the active solvent, and (e) water; wherein: (f) the active solvent is brought into contact with the particles in the presence of the organic nonsolvent and the water, (g) the dispersion vehicle is at least partially neutralized before the dispersion vehicle is brought into contact with the water, and (h) the amounts of the active solvent, the organic nonsolvent and the water are such that the particles are wetted by the dispersion vehicle but the particles are not substantially solubilized by the active solvent.

The amount of vinylidene fluoride polymer particles present in the coating composition of the invention is subject to wide variation. Usually such particles constitute from about 20 percent to about 90 percent by weight of the binder of the coating composition. From about 30 percent to about 70 percent by weight of the binder is typical.

The binder of coating compositions of the invention may contain, in addition to the vinylidene fluoride polymer particles, other film forming polymers of substantially any conventional type, such as polyacrylates, polyesters, polyurethanes, polyamides, polyepoxides or hybrid polymers such as poly(urethane acrylates), poly(ester acrylates), poly(ester urethanes) and poly(ether urethanes). The polymer may be nonthermosettable, self-thermosettable, as for example an acrylic polymer containing interpolymerized N-butoxymethyl acrylamide, or thermosettable by reaction with an added crosslinking agent, as for example a hydroxyfunctional polyacrylate which may be thermoset by reaction with an aminoplast crosslinking agent.

Examples of suitable aminoplast crosslinking agents are the hexamethyl ether of hexamethylolmelamine, the triethyl trimethyl ether of hexamethylolmelamine, the hexabutyl ether of hexamethylolmelamine, the hexaethyl ether of hexamethylolmelamine, polymeric butylated melamine-formaldehyde resins, butylated urea-formaldehyde resins and glycoluril resins.

The applied thermosettable coatings may be cured in various ways at temperatures of from about 20° C. to about 300° C. When a crosslinking agent is present, the coatings are usually cured by baking. The baking temperature may vary widely, but it is usually in the range of from about 80° C. to about 270° C. Similarly, the baking times may be subject to wide variation. Baking times of from about 15 seconds to about 45 minutes are usual. As a rule, an increase in baking temperature permits a decrease in baking time.

Pigments are optional ingredients which are often included in the coating composition. Examples of opacifying pigments include titanium dioxide (rutile or anatase), zinc oxide, zirconium oxide, zinc sulfide and lithopone. Examples of coloring pigments include iron oxides, cadmium sulfide, carbon black, phthalocyanine blue, phthalocyanine green, indanthrone blue, ultramarine blue, chromium oxide, burnt umber, benzidine yellow, toluidine red, aluminum powder and aluminum flakes. Examples of extender pigments include silica, barytes, calcium carbonate, barium sulfate, talc, aluminum silicates, sodium aluminum silicates, potassium aluminum silicates and magnesium silicate. A single pigment may be used or mixtures of pigments may be employed. When pigment is used, it is generally present in an amount in the range of from about 0.1 to about 60 percent by weight of the coating composition. Often it is present in an amount in the range of from about 0.5 to about 50 percent. Usually it is present in an amount in the range of from about 1 to about 35 percent by weight of the coating composition.

Dyes and tints may optionally be included in the coating composition in conventional amounts.

Another optional ingredient is resinous pigment dispersant or grinding vehicle. There are many resinous dispersants which are commercially available for that purpose. These dispersants are used in the manner and in amounts known to the art.

Conventional plasticizers such as dibutyl phthalate, butyl benzyl phthalate, diisooctyl phthalate, decyl butyl phthalate, diisooctyl adipate, dibutyl sebacate, butyl benzoate, triisooctyl trimellitate, n-octyl n-decyl trimellitate, and tricresyl phosphates and flow promoters such as phenyl benzoate, dibenzyl ketone, benzyl methyl ketone, poly(ethylene oxide) and the like may also be optionally included in amounts customary in the art.

Any of the conventional viscosity control agents may be optionally employed in the composition. The preferred materials are resinous or polymeric viscosity control agents. Many of these resinous materials are available. Illustrative of such materials are cellulose actate butyrate, poly(acrylic acid), poly(acrylamides), hydroxyethyl cellulose and its derivatives, poly(N-vinyl-2-pyrrolidone), and the like. These viscosity control agents are used in the manner and in amounts known to the art.

The listing of optional ingredients discussed above is by no means exhaustive. Other ingredients may be employed in their customary amounts of their customary purposes so long as they do not seriously interfere with good coatings practice.

The coating compositions of the invention are usually prepared by simply admixing the various ingredients. Although mixing is typically accomplished at room temperature, elevated temperatures are sometimes used. The maximum temperature which is usable depends upon the heat stability of the ingredients. Temperatures above about 80° C. are only rarely employed.

The coating compositions of the invention are generally used to form coatings on substrates. The substrate is coated with the coating composition using substantially any technique known to the art. These include spraying, curtain coating, dipping, roller application, printing, brushing and drawing.

Dry coatings of the coating composition of the invention usually have thicknesses in the range of from about 2.5 micrometers to about 2 millimeters. Typically they have thicknesses in the range of from about 5 micrometers to about 25 micrometers.

In the illustrative examples which follow, all parts are parts by weight and percentages are percent by weight unless otherwise specified.

EXAMPLE I

A solution is prepared by admixing 7.1 parts acrylic polymer composition (WR-97; Rohm & Hass Co.), 27.3 parts N-methylpyrrolidone and 50 parts 2-butoxyethanol. Forty-five parts vinylidene fluoride polymer particles (Kynar 500; Pennwalt Corp.) is then dispersed into the solution by mixing for 5 minutes with a Cowles dissolver to form a first intermediate composition. Then there is added sequentially, with agitation, 0.2 part dimethylethanolamine and 50 parts deionized water. The resulting product is a stable aqueous dispersion of vinylidene fluoride polymer particles.

EXAMPLE II

A solution is prepared by blending 130 parts 2-butoxyethanol and 76.4 parts N-methylpyrrolidene.

A first intermediate composition is prepared by admixing 206.4 parts of the above solution and 134 parts Kynar 500 vinylidene fluoride polymer particles.

A second intermediate composition is prepared by admixing 340.4 parts of the above first intermediate composition, 31.7 parts WR-97 acrylic polymer composition and 200 parts titanium dioxide pigment and thereafter grinding the mixture for 15 minutes with zirconia beads.

A third intermediate composition is prepared by admixing 230.3 parts of the above second intermediate composition and one part dimethylethanolamine.

A stable aqueous dispersion of vinylidene fluoride polymer particles is prepared by admixing 231.3 parts of the above third intermediate composition and 104.2 parts deionized water.

EXAMPLE III

A reactor equipped with a heater, a cooler, an agitator, a thermometer, a condenser set for total reflux and a source of nitrogen is charged with 159 parts deionized water, 0.46 parts sodium dioctyl sulfosuccinate and 0.23 part sodium bicarbonate. A nitrogen blanket is applied and the charged materials are heated to temperatures in the range of 80° C. to 84° C. and 5.7 parts of a composition containing 0.7 part ammonium persulfate and 5 parts deionized water is added. The addition of 184.14 parts of a monomer composition containing 137.8 parts methyl methacrylate, 36.7 parts butyl acrylate, 7.8 parts 2-hydroxypropyl methacrylate and 1.84 parts acrylic acid is begun. Ninety minutes after beginning the addition of the monomer composition, the concurrent addition of 58.20 parts of a composition containing 0.46 part sodium dioctyl sulfosuccinate and 57.74 parts deionized water is begun. Ninety minutes later, both additions are completed. The temperature throughout both additions is maintained in the range of from 80° C. to 84° C. Upon completion of the concurrent additions, the reaction mixture is maintained at temperatures in the range of from 80° C. to 84° C. for 2 hours. At the end of this period, the reaction mixture is cooled to temperatures in the range of from 32° C. to 35° C. An addition of 2.04 parts of a composition containing 1.02 parts dimethylethanolamine and 1.02 parts deionized water is then made and the reaction mixture is held for 15 minutes. At the end of this time, an addition of 0.22 parts of a composition containing 0.11 part antimicrobial agent (Proxel CRL; ICI Americas, Inc.) and 0.11 part deionized water and the reaction mixture is held for 15 minutes. One part of a reacted silica in a hydrocarbon liquid (Balab Bubble Breaker 3056-A; Witco Chemical Corp.) is added and the reaction mixture is filtered into containers. The resulting product is a water based acrylic latex composition.

A coating composition is prepared by admixing 89.8 parts of the stable aqueous dispersion of Example I, 39.5 parts of the above water based acrylic latex composition and 4.2 parts of the hexamethyl ether of hexamethylolmelamine. The coating composition is drawn down on a chromate pretreated aluminum panel and baked at 260° C. for 45 seconds to produce a clear thermoset coating.

EXAMPLE IV

A coating composition is prepared by admixing 335.5 parts of the stable aqueous dispersion of Example II, 98 parts of the water based acrylic latex composition of Example III and 5.7 parts of the hexamethyl ether of hexamethylolmelamine. The coating composition is drawn down on a chromate pretreated aluminum panel and baked at 260° C. for 45 seconds to produce a white thermoset coating of good appearance.

EXAMPLE V

A first intermediate composition is prepared by admixing 31.7 parts WR-97 acrylic polymer composition, 30 parts 2-butoxyethanol and 200 parts titanium dioxide pigment for 15 minutes using a Cowles dissolver.

A second intermediate composition is prepared by admixing 261.7 parts of the above first intermediate composition, 1 part dimethylethanolamine and 181.7 parts deionized water.

A third intermediate composition is prepared by admixing 75 parts of the stable aqueous dispersion of Example I 50.1 parts of the above second intermediate composition, 30.2 parts of the water based acrylic latex composition of Example III and 1.8 parts of the hexamethyl ether of hexamethylolmelamine.

A coating composition is prepared by admixing 157.1 parts of the above third intermediate composition and 11.6 parts of the above second intermediate composition. The coating composition is drawn down on a primed aluminum panel and baked at 260° C. for 45 seconds to produce a white thermoset coating.

EXAMPLE VI

A first additive composition is prepared by admixing 186.5 parts methyl methacrylate, 12.7 parts methacrylic acid, 12.7 parts 2-hydroxyethyl acrylate and 4.2 parts tert-dodecyl mercaptan.

A second additive composition is prepared by admixing 31.7 parts 2-ethoxyethanol and 3.17 parts α,α-azobisisobutyronitrile.

A reactor equipped with a heater, an agitator, a thermometer, a condenser set for total reflux and a source of nitrogen is charged with 38.3 parts 2-ethoxyethanol, 21.6 parts of the first additive composition and 3.5 parts of the second additive composition. A nitrogen blanket is applied and the charged materials are heated to reflux. The nitrogen is then turned off and the concurrent but separate additions of 194.9 parts of the first additive composition and 31.37 parts of the second additive composition are begun. During the additions the reaction mixture is maintained at reflux. The additions are completed in 3 hours. Two parts 2-ethoxyethanol is added and then the addition of 4.73 parts of a composition containing 3.8 parts 2-ethoxyethanol and 0.93 part tert-butyl perbenzoate is begun. The reaction mixture is maintained at reflux during the addition which is completed in 2 hours. The reaction mixture is held at reflux for one hour and then cooled to 99° C. Dimethylethanolamine in the amount of 10.5 parts is added below the surface of the reaction mixture and the reaction mixture is agitated for 30 minutes. At the conclusion of this period, 420 parts deionized water, preheated to 66° C. is added. The reaction mixture is filtered to produce an acrylic intermediate composition.

A pigment paste intermediate is formed by admixing 53.76 parts of the above acrylic intermediate composition, 0.40 part dimethylethanolamine, 3.11 parts defoamer composition (Defoamer L-475; Drew Chemical Corp.), 54.16 parts N-methylpyrrolidone, 82.65 parts black pigment (a mixture of oxides of copper, chromium and manganese, 4.42 parts titanium dioxide pigment, 26.17 parts red iron oxide pigment ($Fe_2O_3$) and 30.09 parts raw sienna. The pigment paste intermediate is ground in a zirconia mill to a Hegman value of 7.5. The ground materials are removed from the mill and the mill is washed out with 124.97 parts of a washout composition containing 53.76 parts of the above acrylic intermediate composition, 21.06 parts N-methylpyrrolidone, 30.09 parts ethylene glycol and 20.06 parts 2-(2-butoxyethoxy)ethanol. The washout composition is combined with the ground materials to form a pigment paste.

To 379.73 parts of the pigment paste is added 232.8 parts Kynar 500 vinylidene fluoride polymer particles and the mixture is ground to a Hegman value of 7.0 using a Cowles dissolver, then 37.44 parts polyethylene emulsion (Michem Emulsion No. 68725; Michelman Chemicals, Inc.) is added with mixing. Next is added, with low speed mixing, 99.67 parts of the water based acrylic latex composition of Example III. Upon completion of the addition, 17.83 parts silica flatting pigment is added, then high speed mixing is applied for 30 minutes. The following materials are added in order while mixing: 291.04 parts of the water based acrylic latex composition of Example III, 2.09 parts of a reacted silica in a hydrocarbon liquid (Balab Bubble Breaker 3056-A), 3.39 parts 2-butoxyethanol and 22.99 parts of the hexamethyl ether of hexamethylolmelamine. The resulting product is a water based brown enamel.

We claim:

1. A method for producing a stable aqueous dispersion of particles of vinylidene fluoride polymer comprising bringing into admixture:
   (a) unstabilized particles of vinylidene fluoride polymer,
   (b) dispersion vehicle which is an interpolymer of monoethylenically unsaturated monomers wherein said monomers comprise acrylic ester monomer and monoethylenically unsaturated acid and which is at least partially neutralized,
   (c) liquid organic active solvent for said vinylidene fluoride polymer wherein said active solvent is miscible with water and wherein said active solvent would itself dissolve vinylidene fluoride polymer particles at some temperature below about 40° C.,
   (d) liquid organic nonsolvent for said vinylidene fluoride polymer wherein said organic nonsolvent is miscible with water and with said active solvent, and
   (e) water; wherein:
   (f) said active solvent is brought into contact with said particles in the presence of said organic nonsolvent,
   (g) said dispersion vehicle is at least partially neutralized before said dispersion vehicle is brought into contact with said water, and
   (h) the amounts of said active solvent and said organic nonsolvent are such that such particles are wetted by said dispersion vehicle but said particles are not substantially solubilized by said active solvent.

2. The method of claim 1 wherein methyl methacrylate constitutes at least about 50 percent by weight of said monomers.

3. The method of claim 1 wherein said monoethylenically unsaturated acid is acrylic acid, methacrylic acid or mixtures thereof.

4. The method of claim 1 wherein said monomers include hydroxy functional monoethylenically unsaturated monomer.

5. The method of claim 4 wherein said hydroxy functional monoethylenically unsaturated monomer is 2-hydroxyethyl acrylate, 2-hydroxyethyl methacrylate, 2-hydroxypropyl acrylate, 2-hydroxypropyl methacrylate or mixtures thereof.

6. The method of claim 1 wherein said dispersion vehicle is at least partially neutralized with amine.

7. The method of claim 1 wherein:
(a) said unstabilized particles are admixed with a solution comprising unneutralized dispersion vehicle, said active solvent and said organic nonsolvent to form at first intermediate composition,
(b) said unneutralized dispersion vehicle in said first intermediate composition is at least partially neutralized to form a second intermediate composition, and
(c) said second intermediate composition is admixed with said water.

8. The method of claim 1 wherein:
(a) said unstabilized particles are admixed with a solution comprising said active solvent and said organic nonsolvent to form a first intermediate composition.
(b) said first intermediate composition is admixed with unneutralized dispersion vehicle to form a second intermediate composition,
(c) said unneutralized dispersion vehicle in said second intermediate composition is at least partially neutralized to form a third intermediate composition, and
(d) said third intermediate composition is admixed with said water.

9. The method of claim 1 wherein:
(a) unneutralized dispersion vehicle in a solution comprising said unneutralized dispersion vehicle and said organic nonsolvent is at least partially neutralized to form a first intermediate composition,
(b) said first intermediate composition is admixed with said active solvent to form a second intermediate composition,
(c) said second intermediate composition is admixed with said unstabilized particles to form a third intermediate composition, and
(d) said third intermediate composition is admixed with said water.

10. A method for producing a stable aqueous dispersion of particles of vinylidene fluoride polymer comprising bringing into admixture:
(a) unstabilized particles of vinylidene fluoride polymer,
(b) dispersion vehicle which is an interpolymer of monoethylenically unsaturated monomers wherein said monomers comprise acrylic ester monomer and monoethylenically unsaturated acid and which is at least partially neutralized,
(c) liquid organic active solvent for said vinylidene fluoride polymer wherein said active solvent is miscible with water and wherein said active solvent would itself dissolve vinylidene fluoride polymer particles at some temperature below about 40° C., and
(d) water; wherein:
(e) said active solvent is brought into contact with said particles in the presence of said water,
(f) said dispersion vehicle is at least partially neutralized before said dispersion vehicle is brought into contact with said water, and
(g) the amounts of said active solvent and said water are such that said particles are wetted by said dispersion vehicle but said particles are not substantially solubilized by said active solvent.

11. A method for producing a stable aqueous dispersion of particles of vinylidene fluoride polymer comprising bringing in admixture:
(a) unstabilized particles of vinylidene fluoride polymer,
(b) dispersion vehicle which is an interpolymer of monoethylenically unsaturated monomers wherein said monomers comprise acrylic ester monomer and monoethylenically unsaturated acid and which is at least partially neutralized,
(c) liquid organic active solvent for said vinylidene fluoride polymer wherein said active solvent is miscible with water and wherein said active solvent would itself dissolve vinylidene fluoride polymer particles at some temperature below about 40° C.,
(d) liquid organic nonsolvent for said vinylidene fluoride polymer wherein said nonsolvent is miscible with water and with said active solvent, and
(e) water; wherein:
(f) said active solvent is brought into contact with said particles in the presence of said organic nonsolvent and said water,
(g) said dispersion vehicle is at least partially neutralized before said dispersion vehicle is brought into contact with said water, and
(h) the amounts of said active solvent, said organic nonsolvent and said water are such that said particles are wetted by said disperson vehicle but said particles are not substantially solubilized by said active solvent.

12. A stable aqueous dispersion of particles of vinylidene fluoride polymer which has been produced by the method of claim 1.

13. A stable aqueous dispersion of particles of vinylidene fluoride polymer which has been produced by the method of claim 2.

14. A stable aqueous dispersion of particles of vinylidene fluoride polymer which has been produced by the method of claim 3.

15. A stable aqueous dispersion of particles of vinylidene fluoride polymer which has been produced by the method of claim 4.

16. A stable aqueous dispersion of particles of vinylidene fluoride polymer which has been produced by the method of claim 5.

17. A stable aqueous dispersion of particles of vinylidene fluoride polymer which has been produced by the method of claim 6.

18. A stable aqueous dispersion of particles of vinylidene fluoride polymer which has been produced by the method of claim 7.

19. A stable aqueous dispersion of particles of vinylidene fluoride polymer which has been produced by the method of claim 8.

20. A stable aqueous dispersion of particles of vinylidene fluoride polymer which has been produced by the method of claim 9.

21. A stable aqueous dispersion of particles of vinylidene fluoride polymer which has been produced by the method of claim 10.

22. A stable aqueous dispersion of particles of vinylidene fluoride polymer which has been produced by the method of claim 11.

23. In a coating composition comprising film-forming binder, aqueous fluid diluent and particles of vinylidene fluoride polymer, the improvement comprising said coating composition having formulated therein the stable aqueous dispersion of claim 12.

24. In a coating composition comprising film-forming binder, aqueous liquid diluent and particles of vinylidene fluoride polymer, the improvement comprising said coating composition having formulated therein the stable aqueous dispersion of claim 18.

25. In a coating composition comprising film-forming binder, aqueous liquid diluent and particles of vinylidene fluoride polymer, the improvement comprising said coating compositon having formulated therein the stable aqueous dispersion of claim 19.

26. In a coating composition comprising film-forming binder, aqueous liquid diluent and particles of vinylidene fluoride polymer, the improvement comprising said coating composition having formulated therein the stable aqueous dispersion of claim 20.

27. In a coating composition comprising film-forming binder, aqueous liquid diluent and particles of vinylidene fluoride polymer, the improvement comprising said coating composition having formulated therein the stable aqueous dispersion of claim 21.

28. In a coating compositon comprising film-forming binder, aqueous liquid diluent and particles of vinylidene fluoride polymer, the improvement comprising said coating composition having formulated therein the stable aqueous dispersion of claim 22.

* * * * *